United States Patent
Reh et al.

(10) Patent No.: US 9,930,761 B2
(45) Date of Patent: *Mar. 27, 2018

(54) GROUPING OF WIRELESS DEVICES DURING COMMISSIONING

(71) Applicant: FABRIQ, LTD., Boulder, CO (US)

(72) Inventors: Jeffrey G. Reh, Longmont, CO (US); Matthew B. O'Kelley, Boulder, CO (US)

(73) Assignee: FABRIQ, LTD., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,288

(22) Filed: Jan. 30, 2017

(65) Prior Publication Data

US 2017/0142815 A1   May 18, 2017

Related U.S. Application Data

(63) Continuation of application No. 14/876,340, filed on Oct. 6, 2015, now Pat. No. 9,560,727.

(60) Provisional application No. 62/060,175, filed on Oct. 6, 2014.

(51) Int. Cl.

| | |
|---|---|
| H05B 37/00 | (2006.01) |
| H05B 39/00 | (2006.01) |
| H05B 41/00 | (2006.01) |
| H05B 37/02 | (2006.01) |
| H05B 33/08 | (2006.01) |
| H05B 41/36 | (2006.01) |
| H04B 10/116 | (2013.01) |

(52) U.S. Cl.
CPC ....... H05B 37/0272 (2013.01); H04B 10/116 (2013.01); H05B 33/0842 (2013.01); H05B 41/36 (2013.01)

(58) Field of Classification Search
CPC . H05B 37/0272; H05B 33/0842; H05B 41/36
USPC .......................................................... 315/320
See application file for complete search history.

(56) References Cited

U.S. PATENT DOCUMENTS

| | | | |
|---|---|---|---|
| 7,020,701 B1 | 3/2006 | Gelvin et al. | |
| 7,307,542 B1 | 12/2007 | Chandler et al. | |
| 7,382,271 B2 | 6/2008 | McFarland | |
| 7,400,594 B2 | 7/2008 | Pereira et al. | |
| 7,623,042 B2 | 11/2009 | Huizenga | |
| 7,889,051 B1 | 2/2011 | Billig et al. | |
| 7,925,384 B2 | 4/2011 | Huizenga et al. | |
| 7,953,327 B2 | 5/2011 | Pereira et al. | |
| 8,049,434 B2 | 11/2011 | Crouse et al. | |
| 8,159,156 B2 | 4/2012 | Henig et al. | |
| 8,264,168 B2 | 9/2012 | Feri et al. | |

(Continued)

*Primary Examiner* — Daniel D Chang

(74) *Attorney, Agent, or Firm* — Richard K. Huffman

(57) ABSTRACT

An apparatus for creating functional lighting groups is provided. The apparatus includes a plurality of wireless devices and a gateway. The plurality of wireless devices has a common circuit and legacy line voltage switch, and is configured to enter a grouping mode responsive to commissioning commands sent over a wireless network, and is configured to send messages over the wireless network indicating that they have been power cycled by a legacy line voltage switch. The gateway is coupled to the plurality of wireless devices over the wireless network, and is configured to receive the messages, and is configured to create a functional lighting group comprising the plurality of wireless devices.

20 Claims, 3 Drawing Sheets

(56) References Cited

U.S. PATENT DOCUMENTS

| | | | |
|---|---|---|---|
| 8,265,674 B2 * | 9/2012 | Choong | G06F 1/3278 340/3.1 |
| 8,290,437 B2 * | 10/2012 | Simons | G01S 5/0289 342/458 |
| 8,373,362 B2 | 2/2013 | Chemel et al. | |
| 8,422,401 B1 | 4/2013 | Choo-Choong et al. | |
| 2007/0121648 A1 | 5/2007 | Hahn | |
| 2008/0030075 A1 | 2/2008 | Stanley et al. | |
| 2009/0026966 A1 | 1/2009 | Budde et al. | |
| 2009/0045939 A1 * | 2/2009 | Holland | H04W 24/00 340/524 |
| 2009/0066473 A1 | 3/2009 | Simons | |
| 2011/0043116 A1 | 2/2011 | Schenk et al. | |
| 2011/0090042 A1 * | 4/2011 | Leonard | G05B 15/02 340/5.1 |
| 2011/0199004 A1 | 8/2011 | Henig et al. | |
| 2012/0068822 A1 | 3/2012 | Sheikman et al. | |
| 2012/0194083 A1 | 8/2012 | Henig et al. | |
| 2012/0242231 A1 | 9/2012 | Yianni et al. | |
| 2014/0001963 A1 * | 1/2014 | Chobot | H05B 37/02 315/153 |
| 2015/0319006 A1 * | 11/2015 | Plummer | H04L 12/2827 700/83 |

* cited by examiner

METHOD FOR CREATING FUNCTIONAL WIRELESS LIGHTING GROUPS

GROUPING OF WIRELESS DEVICES DURING COMMISSIONING

CROSS-REFERENCE TO RELATED APPLICATIONS

This application is a continuation of the following U.S. Nonprovisional Patent Application, which is herein incorporated by reference.

| SER. NO. | FILING DATE | TITLE |
|---|---|---|
| 14/876,340 (FBQ.1009) | Oct. 6, 2015 | APPARATUS AND METHOD FOR CREATING FUNCTIONAL WIRELESS LIGHTING GROUPS |

U.S. Nonprovisional patent application Ser. No. 14/876,340 claims the benefit of the following U.S. Provisional Application, which is herein incorporated by reference.

| SER. NO. | FILING DATE | TITLE |
|---|---|---|
| 62/060,175 (FBQ.1009) | Oct. 6, 2014 | APPARATUS AND METHOD FOR CREATING FUNCTIONAL WIRELESS LIGHTING GROUPS |

This application is related to the following U.S. Nonprovisional Patent Application, which is herein incorporated by reference.

| SER. NO. | FILING DATE | TITLE |
|---|---|---|
| 15/419,232 (FBQ.1009-C1) | Jan. 30, 2017 | MECHANISM FOR CREATING FUNCTIONAL WIRELESS LIGHTING GROUPS |

BACKGROUND OF THE INVENTION

Field of the Invention

This invention relates in general to the field building automation, and more particularly to an apparatus and method for grouping wireless devices during commissioning of the wireless devices.

Description of the Related Art

Present day building lighting systems are generally controlled via wired interfaces, and these systems may be either monitored or unmonitored. As one skilled in the art will appreciate, there is substantial momentum to convert these wired lighting systems over to more efficient wireless lighting systems that allow for wireless control and management of devices therein. Although inventive concepts presented herein may be applied to a diverse number of wired/wireless devices and systems, for clarity purposes this disclosure will be presented in terms of an exemplary building comprising a plurality of light fixtures, along with associated switches, occupancy sensors, daylight harvesters, and other associated building automation devices. The building may be undergoing energy efficiency improvements through the installation of wireless radios in each of the light fixtures, wireless switches, wireless sensors, and wireless controls, to allow for more efficient use of electrical power.

The present inventors have observed that when a present day wireless network is created, in order to configure the network of devices for proper operation, determination of the devices' locations and functional groupings is mandatory. But present day techniques for identifying, locating, and grouping devices require that unknown devices be identified and located one device at a time, which is incredibly labor intensive, time consuming, and error prone.

When converting a system of wired devices into a controllable network of wireless devices, the process described above must be accomplished so that wireless controls and sensors throughout the building are configured to interoperate with each of the functional groups of devices in substantially the same manner as their wired controls and sensors that are being replaced. That is, the wireless network needs to be configured so that, say, a wireless on/off switch in a particular office area only controls the light fixtures therein, and does not control additional light fixtures down the hall or in other parts of the building.

Furthermore, the labor associated with locating and grouping devices into functional groups is also substantial, even with accurate floor plans, the labor required to perform these tasks is steep and expensive and because of intensive human involvement, the process is prone to error.

Therefore, what is needed is an apparatus and method for identifying, locating and functionally grouping a plurality of devices in a wireless network that exhibits a substantial reduction in error over that which has heretofore been provided.

What is also needed is a technique for creating functional groups of devices in a wireless network.

What is furthermore needed is a mechanism for creating functional groups of wireless devices that does not require the wireless devices to be identified and located one at a time.

SUMMARY OF THE INVENTION

The present invention, among other applications, is directed to solving the above-noted problems and addresses other problems, disadvantages, and limitations of the prior art by providing a superior technique for creating functional lighting groups in buildings.

One aspect of the present invention contemplates an apparatus for creating functional lighting groups. The apparatus includes a plurality of wireless devices and a gateway. The plurality of wireless devices has a common circuit and legacy line voltage switch, and is configured to enter a grouping mode responsive to commissioning commands sent over a wireless network, and is configured to send messages over the wireless network indicating that they have been power cycled by a legacy line voltage switch. The gateway is coupled to the plurality of wireless devices over the wireless network, and is configured to receive the messages, and is configured to create a functional lighting group comprising the plurality of wireless devices.

Another aspect of the present invention envisions an apparatus for creating functional lighting groups. The apparatus has a plurality of wireless devices, a commissioning device, and a gateway. The plurality of wireless devices has a common circuit and legacy line voltage switch, and is configured to enter a grouping mode responsive to commissioning commands sent over a wireless network, and is configured to send messages over the wireless network indicating that they have been power cycled by a legacy line voltage switch. The commissioning device is configured to direct the plurality of wireless devices to enter the grouping mode via the commissioning commands. The gateway is coupled to the plurality of wireless devices over the wireless network, and is configured to receive the messages, and is configured to create a functional lighting group comprising the plurality of wireless devices.

A further aspect of the present invention comprehends a method for creating functional lighting groups, the method comprising: responsive to commissioning commands sent over a wireless network, placing a plurality of wireless devices in a grouping mode, and directing the plurality of wireless devices to send messages over the wireless network indicating that they have been power cycled by a legacy line voltage switch; and receiving the messages within a gateway, and creating a functional lighting group comprising the plurality of wireless devices.

BRIEF DESCRIPTION OF THE DRAWINGS

These and other objects, features, and advantages of the present invention will become better understood with regard to the following description, and accompanying drawings where.

DETAILED DESCRIPTION

Figure 1:
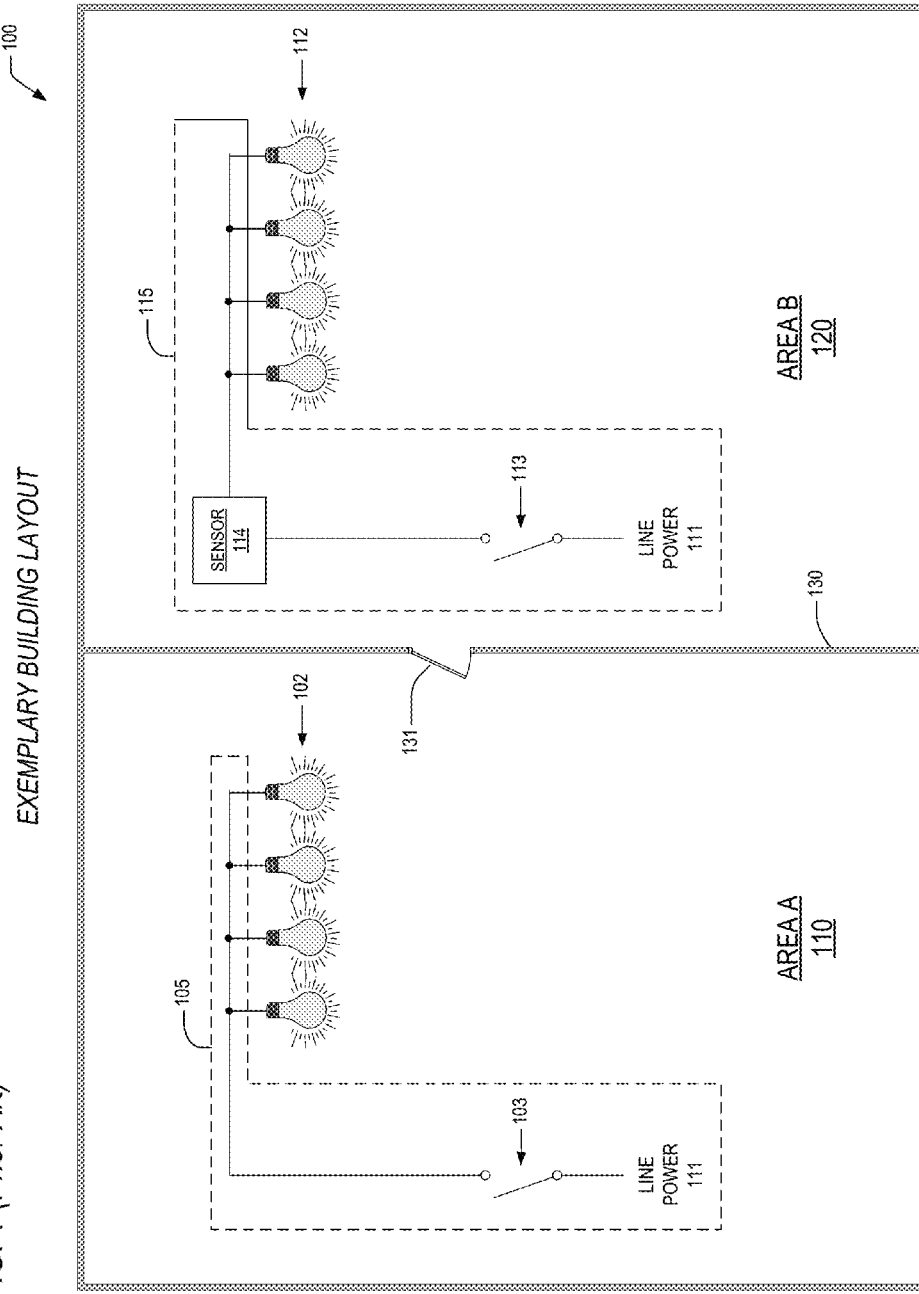
FIG. 1 is a block diagram illustrating an exemplary building layout of wired lighting fixtures.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

In view of the above background discussion on building lighting management and associated techniques employed for identifying and grouping related devices in a wireless network configuration, a discussion of the disadvantages and limitations of these techniques will be presented with reference to FIG. 1. Following this, a discussion of the present invention will be presented with reference to FIGS. 2-3. The present invention overcomes the disadvantages and limitations of present day techniques by providing an apparatus and method for creating functional lighting groups which minimizes configuration error.

Turning to FIG. 1, a block diagram is presented illustrating an exemplary building layout 100 of wired lighting fixtures 102, 112. The building layout 100 includes two areas 110, 120 separated by a wall 130 having a door 131 disposed therein. Such is exemplary of many present day buildings. Area A 110 has a plurality of light fixtures 102 powered by a common circuit 105. Line power 111 is applied to the common circuit 105 through a wired switch 103 within Area A 110. Likewise, Area B 120 has a plurality of light fixtures 112 powered by a common circuit 115. Line power 111 is applied to Area B's common circuit 115 through a wired switch 113 within Area B 120 and wired lighting dynamically controlled by a sensor 114, such as, but not limited to, an occupancy sensor, daylight harvester, etc.

A building or structure, such as is exemplified in the building layout 100, may be segregated into physical areas and logical areas (also referred to herein as a "logical group" or "functional group"). The physical areas are depicted in FIG. 1 as Area A 110 and Area B 120, which are physically separate, as in indicated by the wall 130. The areas 110, 120 may consist of individual office spaces having only one logical area (i.e., an area where light fixtures 102, 112 (also referred to herein as "luminaires") therein are controlled by corresponding switches 103, 113 and sensors 114). Alternatively, a given physical area 110, 120 may comprise a plurality of logical areas. Furthermore, a logical area may span a plurality of physical areas. A physical area 110, 120 may have one or more sensors 114 that are employed to modify the light output of such groups 102, 112, such as sensor 114 is depicted for control of the plurality of light fixtures (also referred to herein as "luminaire group") 112 in Area B 120. In both areas 110, 120, each of the luminaire groups 102, 112 are controlled and powered via common circuits (or, "infrastructure") 105, 115 that supply power and control to the groups of luminaires 102, 112. Switch 103 controls the luminaire group 102 in Area A 110, and both switch 113 and the sensor 114 control the luminaire group 112 in Area B 120.

As is alluded to above, a building owner/occupier may opt to replace/upgrade their present wired lighting configuration, such as is shown in the exemplary building layout 100 of FIG. 1, with an energy efficient and controllable configuration, where light fixtures, sensors, and controls are upgraded to include wireless networking capabilities. And the present inventors have observed that when a present day wireless network is created, identifying information (e.g., network ID, MAC ID, EUI 64, etc.) of corresponding physical devices, their locations relative to each other, and how subsets of these physical devices are functionally grouped together cannot be easily nor economically determined. As one skilled in the art will appreciate, while absolute locations (e.g., their GPS coordinates) of these devices may be desired, in order to configure the network of devices for proper operation, determination of the devices' relative locations and functional groupings is mandatory.

Present day techniques for identifying, locating, and grouping devices typically require that unknown devices be identified and located serially, namely, one device at a time. In other words, a first device is revealed and its identification and location are recorded, typically on a floor plan or building notation log (e.g., "fluorescent lamp fixture, MAC ID XXX, $2^{nd}$ floor conference room northern end"). Then, a second device is revealed, identified, located, and recorded. This serial process continues, until a last device has been identified, located, and recorded.

Many different techniques are employed to reveal devices in order to determine their identities and relative locations. Depending upon device type within the wireless network, these techniques may include, but are not limited to, shining lights, scanning bar codes, pushing buttons, power cycling, emitting sounds, etc. Once all of the devices have been identified and located, then subsets of the devices are placed into functional working groups. In many present day configurations, this placement is achieved via some form of computer interface through which an operator interprets the floor plan or building notation log in order to create each of the functional working groups. Grouping creates sets of devices that act logically as one subsystem.

For instance, in the case of a retrofitted building full of light fixtures, a given office area, like Area A 100 or Area B 120 of FIG. 1, may have four wireless-enabled light fixtures, two wireless occupancy sensors, and one wireless on/off switch. The switch and sensors operate to exclusively control the light fixtures within the given office area. That is, switches and sensors in other areas of the building do not control the fixtures in the given office area, nor do the sensors and switch within the given office area operate to control light fixtures in other areas of the building. Thus, the four light fixtures, the switch, and the sensors form a logical (or, "functional") group within the given office area.

When converting a system of wired devices into a controllable network of wireless devices, the process described above must be accomplished so that wireless controls and wireless sensors throughout the building are configured to interoperate within their corresponding functional groups in substantially the same manner as their wired controls and sensors that are being replaced. That is, the wireless network needs to be configured so that, say, a wireless on/off switch in a particular office area only controls the light fixtures within its logical group, and does not control additional light fixtures down the hall or in other parts of the building that belong to other logical groups.

The present inventors have noted that present day techniques for identifying, locating, and recording devices is disadvantageous at best since only one device at a time can be processed. In order to identify, locate, and record a plurality of devices, each device must be processed in a serial manner, that is, one device after another. Consequently, extensive time and labor are required to identify and group a network that includes the plurality of devices, which is quite costly from an installation perspective. If a particular process requires human intervention (e.g., to read a label, scan a bar code, shine a light, or push a button), then the probability of human error is increased along with the labor cost to remedy errors that are thereby introduced. In addition, the action of reading a label, scanning a bar code, shining a light, or pushing a button may be prohibitively expensive and time consuming. Consider the labor associated with accessing ceiling mounted devices to push a button, or accessing devices that have transducers, electronics, or labels that are internal to the devices. In some cases, the devices may require disassembly in order to reveal the transducers, electronics, or labels. In a building consisting of hundreds of light fixtures, the costs associated with this process are substantial.

Furthermore, the present inventors have noted that the labor associated with locating and grouping devices into functional groups is also substantial, for even with accurate floor plans, the labor required to perform these tasks is steep. Without accurate floor plans, the location and notation steps are additionally prone to imprecision, for present day techniques rely predominantly on human interpretation of the user interface and upon human technicians to derive the proper functional working groups.

The present invention overcomes the disadvantages and limitations of present day lighting upgrade technique, and others, by providing an apparatus and method for creating functional wireless lighting groups that exhibits a significant reduction in error and labor over that which has heretofore been provided. The present invention will now be discussed with reference to FIGS. 2-3.

Figure 2:
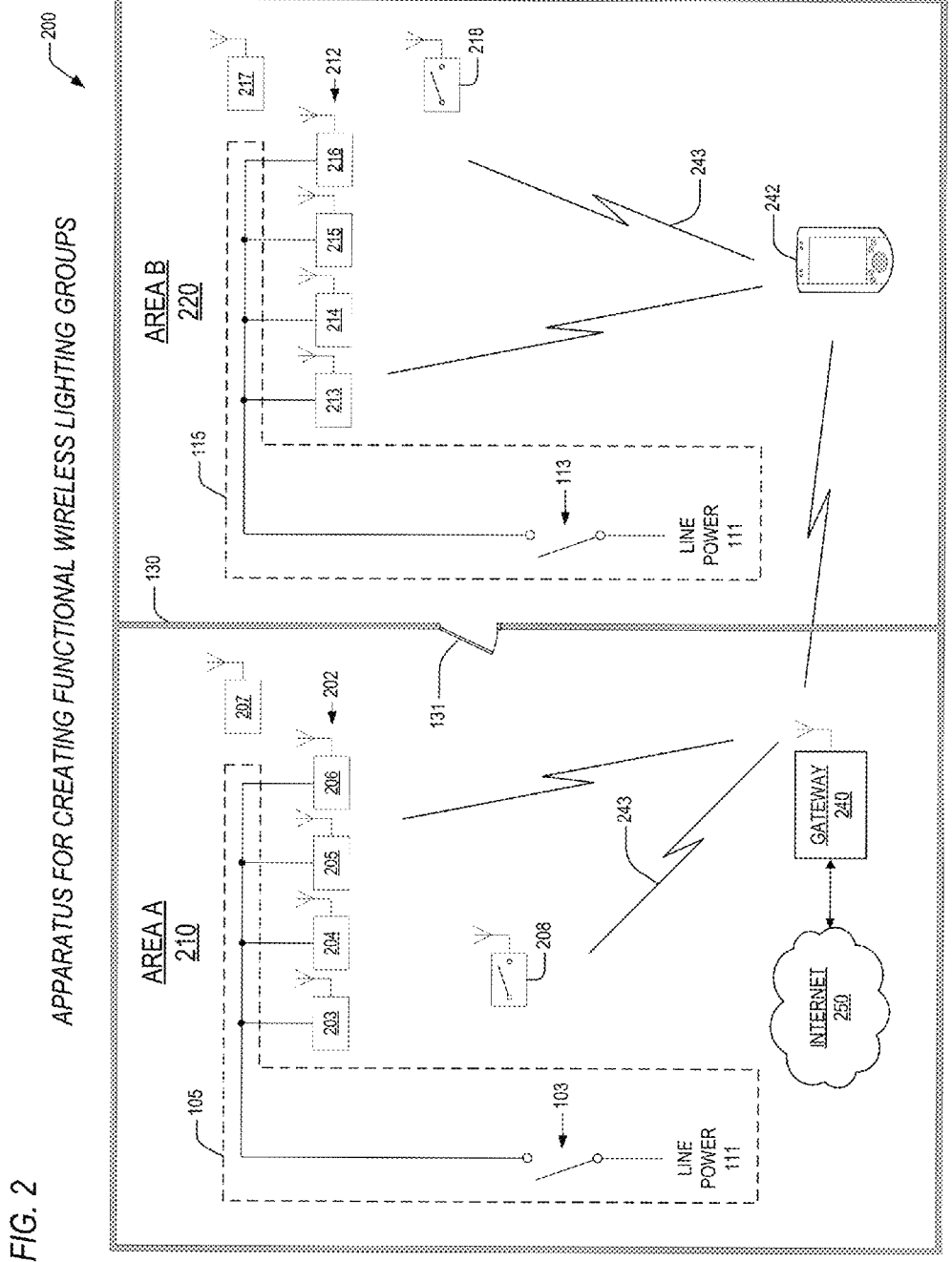
FIG. 2 is a block diagram depicting an apparatus according to the present invention for creating functional wireless lighting groups.

Referring to FIG. 2, a block diagram is presented depicting an apparatus according to the present invention for creating functional wireless lighting groups. The diagram shows an exemplary upgraded building layout 200, very much like the building layout 100 of FIG. 1. The building layout 200 includes two areas 210, 220 separated by a wall 130 having a door 131 disposed therein. Area A 210 has a plurality of wireless light fixtures 203-206 which replaces a corresponding plurality of wired light fixtures (not shown), and which are powered by a common circuit 105, formerly used to power the wired light fixtures. Line power 111 is applied to the common circuit 105 through a wired switch 103 within Area A 210. Accordingly, the light fixtures 203-206 are intended to form a logical group 202. Area A 210 also includes a wireless switch 208 and a wireless sensor 207, such as, but not limited to, a wireless occupancy sensor, a wireless daylight harvester, etc. Likewise, Area B 220 has a plurality of light fixtures 213-216 which replaces a corresponding plurality of wired light fixtures (not shown), and which are powered by a common circuit 115, formerly used to power the wired light fixtures. Line power 111 is applied to Area B's common circuit 115 through a wired switch 113 within Area B 220. Accordingly, the light fixtures 213-216 are intended to form a logical group 212. Area B 220 also includes a wireless switch 218 and a wireless sensor 217, such as, but not limited to, a wireless occupancy sensor, a wireless daylight harvester, etc. The wireless switches 208, 218 and wireless sensors 207, 217 are intended for control and/or management of the wireless luminaires 203-206, 213-216 within their respective logical groups 202, 212.

Like the building layout 100 of FIG. 1, the layout 200 according to the present invention may be segregated into physical areas 210, 220 and functional groups. The physical areas are depicted in FIG. 2 as Area A 210 and Area B 220, which are physically separate, as in indicated by the wall 130. The physical areas 210, 120 may consist of individual office spaces having only one logical area. Alternatively, a given physical area 210, 220 may comprise a plurality of logical areas. Furthermore, a logical area may span a plurality of physical areas 210, 220. A physical area 210, 220 may have one or more wireless switches 208, 218 and wireless sensors 207, 217 that are employed to modify the light output of wireless luminaire groups 202, 212. In both areas 210, 220, each of the wireless luminaire groups 202, 112 are controlled and powered via existing infrastructure 105, 115 that supplies power and control to the groups of luminaires 202, 212, and that formerly supplied power to wired light fixtures replaced in the upgrade. Switch 103 controls power to luminaire group 202 in Area A 210, and switch 113 controls power to luminaire group 212 in Area B 220. Wireless switch 208 and wireless sensor 207 are intended to control lighting in group 202. Wireless switch 218 and wireless sensor 217 are intended to control lighting in group 212. Control of lighting may include, but is not limited to, on/off, luminous intensity level, color, and special effects (e.g., strobe, flash frequency, etc.). Light sources within the wireless lighting fixtures 203-206, 213-216 may include, but are not limited to, fluorescent bulbs, light-emitting diodes, and other sources of controllable light in both the visible and infrared spectrums.

The layout 200 also includes a gateway device 240 that is coupled to the internet 250 (or other wide area network). The gateway device 240 may provide for wireless interconnectivity of the wireless lighting fixtures 203-206, 213-216, the wireless switches 208, 218, the wireless sensors 207, 217, and a wireless commissioning device 242. The gateway 240 provides for wireless interoperability between the wireless devices 203-208, 213-218, the commissioning device 242, and the gateway 240 itself by configuring a wireless network consisting of a plurality of wireless links 243 over which the devices 203-208, 213-218, the commissioning device 242, and the gateway 240 communicate. The wireless network enables communication and control of devices 203-208, 213-218 and on an individual and/or group basis, by both the commissioning device 242 and the gateway 240.

For purposes of the present application, the term "gateway" 240 will be employed to mean all the devices and software (e.g., access points, Internet gateways, coordinators, etc.) that are required to provide for communication with all of the wireless devices 203-208, 213-218, as well as communication via the Internet cloud 250 or other form of wide area network, such as is required for communication and cloud based management and control.

In one embodiment, the wireless commissioning device 242 may comprise a tablet computer such as, but not limited to, an IPAD®. In another embodiment, the commissioning device 242 may comprise a smartphone such as, but not limited to, an ANDROID® phone. A further embodiment contemplates use of a wirelessly enabled laptop computer as the commissioning device 242.

Advantageously, the present invention employs a coordinated exploitation of the existing infrastructure 105, 115 for a legacy wired system of devices (not shown) to enable identification, locating, and recording of functional groups of corresponding wireless devices 203-208, 213-218 in a manner that is superior to that which has heretofore been provided. The commissioning device 242 communicates with the internet 250 and may access a cloud-based server (not shown) for wireless network configuration support. Alternatively, the commissioning device 242 may communicate with the gateway 240 directly. The commissioning device 242 may be employed by a technician to control the wireless devices 203-208, 213-218 and the gateway 240.

In operation, all of the wireless luminaires 203-206, 213-216 and sensors 207, 217 are physically installed and powered up. The existing infrastructure 105, 115 (i.e., legacy power lines and line voltage switches 103, 113) remain installed and functional. That is, the existing wired switches 103, 113 are left in place and the wireless switches 208, 218 are not yet physically installed, but they are however powered on and are communicating over the wireless network over the links 243. In this configuration, the wireless switches 208, 218 may be powered by any of a number of well-known mechanisms including, but not limited to, batteries, power over Ethernet (POE), or common wall outlet adaptors.

Thus, all wireless devices 203-208, 213-218, 240, 242 are communicating on the wireless network over the links 243, but the locations and groupings of the luminaires 203-206, 213-216 and sensors 207, 217 are unknown. For clarity sake, only a small number of luminaires 203-206, 213-216 and sensors 207, 217 are shown in the layout 200, however, one skilled in the art will appreciate that a typical building under which the present invention may be practiced may comprise hundreds of luminaires and sensors divided into a functional lighting groups according to building lighting requirements.

A key feature of the present invention is that the switch legs of the existing infrastructure 105, 115 are employed to reveal both the identity and functional grouping of the luminaires 203-206, 213-216 and sensors 207, 217. This is because the existing legacy line voltage switches 103, 113 are already wired to, and grouped with, their corresponding luminaires 203-206, 213-216. And the presented inventors have observed that present day upgrade techniques deprecate the line voltage switches 103, 113 during installation of the new luminaires 203-206, 213-216 and sensors 207, 217, thereby losing access to the grouping information. The legacy line voltage switches are deprecated in order to prevent the new wireless enabled luminaires from losing power and, thereby, losing their ability to communicate and respond to control messages from associated switches, sensors, gateways, etc. Though the line voltage switches 103, 113 must ultimately be deprecated and replaced by wireless switches 208, 218, the present invention contemplates preservation of line voltage switches 103, 113 to support a novel grouping mode whereby the luminaires 203-206, 213-216, sensors 207, 217, and the wireless switches 208, 218 may by assigned to functional groups. After functional grouping is complete, the line voltage switches 103, 113 are replaced by the wireless switches 208, 218.

The commissioning device 242 may comprise one or more application programs executing thereon, dedicated circuitry, or a combination of application programs and dedicated circuitry to communicate with the gateway 240 and to command the wireless devices 203-208, 213-218 to enter a functional grouping mode. The wireless devices 203-208, 213-218 and the gateway 240 may comprise one or more application programs executing thereon, dedicated circuitry, or a combination of application programs and dedicated circuitry to communicate with the gateway 240 and to perform functional grouping mode functions as will be described below.

In one embodiment, a technician may execute a function on the handheld device 242 to inform the gateway 240 to enter the grouping mode. In response, the gateway 240 will command the wireless devices 203-208, 213-218 to enter into the grouping mode. When in the grouping mode, the technician may enter one of the areas 210, 220 and may instruct the gateway 240 via the handheld device 242 that a new functional group is to be formed. Consider that the technician entered Area A 210. The technician will then cycle the line voltage power 111 using the corresponding legacy line voltage switch 103. All wireless luminaires 203-206 that are wired to the legacy switch leg will have their power turned off and then back on. On power up, the wireless luminaires 203-206 will function normally. Additionally, since the luminaires 203-206 are in grouping mode, they will notify the gateway 240 that they have been powered cycled while in grouping mode via respective messages transmitted over the links 243. The gateway 240 will thus record these luminaires 203-206 as a newly formed group 202, including their corresponding identifying information (e.g., MAC address, manufacturer, device type, version, etc.). Following formation of the new group 202, the technician then toggles their corresponding wireless switch 208 or activates a commissioning control (e.g., push button, toggle switch, etc.) on the wireless switch, which will inform the gateway 240 that a wireless switch has been toggled or had a commissioning control activated while in grouping mode, and the gateway 240 will associate this new wireless switch 208 with the newly created functional group 202 to allow for control of the luminaires 203-206.

Continuing formation of the functional group, the technician then activates a commissioning control (e.g., push button, toggle switch, etc.) on any newly added sensors 207 that are to be employed for additional control of luminaires 203-206 within the group 202, which will inform the gateway 240 that a wireless sensor 207 has had a commissioning control activated while in grouping mode, and the gateway 240 will thus associate this new wireless sensor 207 with the newly created group 202 to allow for additional control of the luminaires 203-206. Once all of the devices 203-208 are grouped, the technician then instructs the gateway 240 that association of devices 203-208 within the group 202 is complete. The technician may also enter informative notations regarding the nature and location of the group 202 during formation and commissioning of the wireless devices 203-208 into the new functional group 202.

The technician may then move on to the next area 220 and will follow the same procedure described above to form a next functional group 212 comprising grouped luminaires 213-216, and associated sensors 217 and wireless switch 218.

The present inventors note that instead of toggling the wireless switches 208, 218 to indicate their relative location, commissioning controls (e.g., push button, toggle switch, etc.) on the wireless switches 208, 218 may be utilized to perform the same function.

When all groupings are complete, the technician then replaces the legacy line voltage switches 103, 113 with the new wireless switches 208, 218.

One advantage of the present invention is that the gateway 240 allows the technician to group the wireless devices 203-208, 213-218 in any order. That is, devices 203-208 may be commissioned before or after commissioning devices 213-218.

The present invention also contemplates the use of multiple commissioning devices 242 by multiple technicians working in the same building at the same time to create functional groups simultaneously. To enable this feature, the gateway 240 will employ time stamp, time series, and/or time delta analyses on messages received in order to properly bin detected events and groups. In addition, or alternatively, the commissioning devices 242 can communicate and coordinate with each other in order to facilitate orderly grouping of events.

Having determined the devices' relative locations and functional groupings, and thereby configuring the network of devices for proper operation, the present invention additionally enables more fine-grained identification and location of individual devices 203-208, 213-218, if desired. Because groups of devices 203-208, 213-218 within a building are inherently smaller in number and more manageable than the set of all devices in the building, coordinated operations such as flashing a luminaire within a specific group and noting its relative physical location within the group on a user interface are enabled. This notation may include the use of captured images of a ceiling grid along with luminaires 203-206, 213-216 and sensors 207, 217 disposed therein in order to enhance the relative and absolute location device metadata. In one embodiment, the functions for such fine-grained identification and location may be disposed within applications programs within the commissioning device 242.

Although the devices 203-208, 213-218 according to the present invention are described above as having dedicated hardware/software disposed therein to enable them to enter and perform functions associated with the functional grouping mode, other embodiments are contemplated as well. For example, certain wireless networks configurations may be configured to send information back to the gateway 240 when stimulated (e.g., a button has been pushed, a device is powering up, toggled, etc.). Accordingly, the gateway 240 for such embodiments may be configured to uniquely interpret these communications in order to identify and group the devices 203-208, 213-218.

Figure 3:
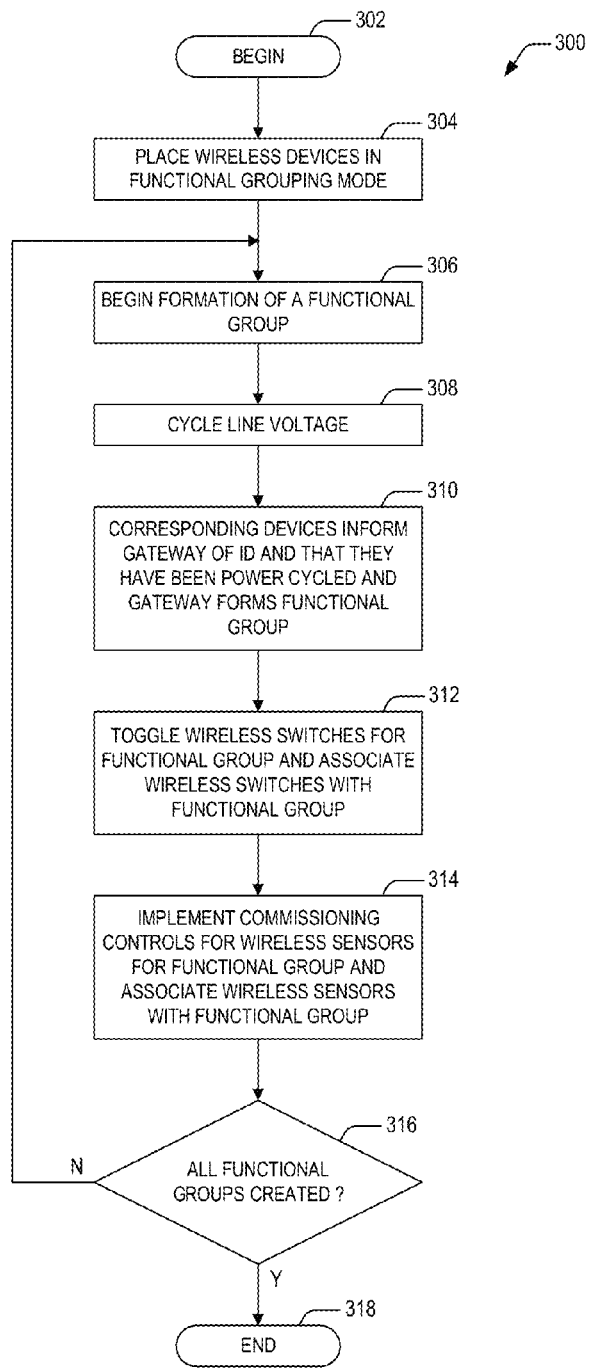
FIG. 3 is a flow diagram featuring a method according to the present invention for creating functional wireless lighting groups.

Referring to FIG. 3, a flow diagram 300 is presented of a method for creating functional lighting groups according to the present invention.

Flow begins at block 302 where a building that had been retrofitted with wireless luminaires, switches, and sensors and legacy line voltage switches are retained. Flow then proceeds to block 304.

At block 304, all the wireless devices are placed into a functional grouping mode via gateway and commissioning device messages over a wireless network. Flow then proceeds to block 306.

At block 306, formation of a new functional group is initiated via commands implemented over a commissioning device. Flow then proceeds to block 308.

At block 308, a technician corresponding to the commissioning device cycles line voltage via one of the legacy line voltage switches. Flow then proceeds to block 310.

At block 310, wireless devices that have been power cycled via the technician's action in block 308 inform the gateway of their identifying information and that they have been power cycled while in grouping mode. The gateway then groups the power cycled wireless devices into the new functional group. Flow then proceeds to block 312.

At block 312, the technician toggles or activates a commissioning control (e.g., push button, toggle switch, etc.) on one or more wireless switches to be associated with the new functional group. The wireless switches inform the gateway of their identifying information and that they have been toggled or had a commissioning control activated while in grouping mode. The gateway then adds the affected wireless switches to the new functional group. Flow then proceeds to block 314.

At block 314, the technician activates a commissioning control (e.g., push button, toggle switch, etc.) on one or more wireless switches to be associated with the new functional group. The wireless switches inform the gateway of their identifying information and that they have had a commissioning control activated while in grouping mode. The gateway then adds the affected wireless switches to the new functional group. Flow then proceeds to decision block 316.

At decision block 316, an evaluation is made to determine if all functional groups within the building have been created. If not, then flow proceeds to block 308. If so, then flow proceeds to block 318.

At block 318, the method completes, allowing deprecation and removal of the legacy line voltage switches, and installation of the grouped and commissioned wireless switches.

One advantage of present invention is that it may be employed to efficiently derive functional lighting groups from existing infrastructure, thus eliminating the need to rely upon serial processes and human interpretation, thereby minimizing mistakes and saving time and labor. Devices can be identified and a functional wireless network of the devices can be created with labor that has minimal training and knowledge of networks.

Another advantage of the present invention is that multiple devices can be identified and grouped simultaneously in a robust and reliable manner.

The gateway according to the present invention logically groups specific physical wireless devices together to function as one or more functional lighting groups. Via one or more commissioning devices, technicians may record the relative location of the functional lighting group (and thereby of the individual devices)—with or without the aid of an existing floor plan. For example, functional lighting groups are typically associated with well-known landmarks such as "CEO Office" or "$2^{nd}$ Floor Conference Room North." Accordingly, it is noted that the present invention creates highly accurate functional lighting groups by deriving those groups from existing infrastructure. Thus, the process of functional grouping does not rely nor depend on the absolute accuracy of geo-location for each of the devices in the network. This is a marked improvement over present day identification, location, and recording mechanisms, which are particularly frail because they are highly dependent upon device location information in order to create a functional group.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for creating functional lighting groups, the apparatus comprising:
   a plurality of wireless devices having a common circuit and legacy line voltage switch, configured to enter a grouping mode responsive to commissioning commands sent over a wireless network, and configured to send messages over said wireless network indicating that they have been power cycled by said legacy line voltage switch; and
   a gateway, coupled to said plurality of wireless devices over said wireless network, configured to receive said messages, and configured to create a functional lighting group comprising said plurality of wireless devices.

2. The apparatus as recited in claim 1, wherein said plurality of wireless devices comprises wireless lighting fixtures, and wherein said wireless lighting fixtures are power cycled via activation of said legacy line voltage switch.

3. The apparatus as recited in claim 2, wherein said wireless lighting fixtures comprise wireless fluorescent lights.

4. The apparatus as recited in claim 2, wherein said wireless lighting fixtures comprise wireless light-emitting diode (LED) lights.

5. The apparatus as recited in claim 2, wherein said plurality of wireless devices further comprises a wireless switch, and wherein, after formation of said functional lighting group, an operator toggles said wireless switch, and said gateway receives said messages and adds said wireless switch to said functional lighting group.

6. The apparatus as recited in claim 5, further comprising:
   a wireless sensor, configured to send a commissioning message to said gateway when a corresponding commissioning control is activated by said operator, wherein upon receipt of said commissioning message, said gateway adds said wireless sensor to said functional lighting group.

7. The apparatus as recited in claim 1, wherein said gateway is coupled via the internet to a cloud-based server, and wherein said cloud-based server communicates with said gateway and a commissioning device to enable formation of said functional lighting group.

8. An apparatus for creating functional lighting groups, the apparatus comprising:
   a plurality of wireless devices having a common circuit and legacy line voltage switch, configured to enter a grouping mode responsive to commissioning commands sent over a wireless network, and configured to send messages over said wireless network indicating that they have been power cycled by said legacy line voltage switch;
   a commissioning device, configured to direct said plurality of wireless devices to enter said grouping mode via said commissioning commands; and
   a gateway, coupled to said plurality of wireless devices over said wireless network, configured to receive said messages, and configured to create a functional lighting group comprising said plurality of wireless devices.

9. The apparatus as recited in claim 8, wherein said plurality of wireless devices comprises wireless lighting fixtures, and wherein said wireless lighting fixtures are power cycled via activation of a said legacy line voltage switch.

10. The apparatus as recited in claim 9, wherein said wireless lighting fixtures comprise wireless fluorescent lights.

11. The apparatus as recited in claim 9, wherein said wireless lighting fixtures comprise wireless light-emitting diode (LED) lights.

12. The apparatus as recited in claim 9, wherein said plurality of wireless devices further comprises a wireless switch, and wherein, after formation of said functional lighting group, an operator toggles said wireless switch, and said gateway receives said messages and adds said wireless switch to said functional lighting group.

13. The apparatus as recited in claim 12, further comprising:
   a wireless sensor, configured to send a commissioning message to said gateway when a corresponding commissioning control is activated by said operator, wherein upon receipt of said commissioning message, said gateway adds said wireless sensor to said functional lighting group.

14. The apparatus as recited in claim 8, wherein said gateway is coupled via the internet to a cloud-based server, and wherein said cloud-based server communicates with said gateway and said commissioning device to enable formation of said functional lighting group.

15. A method for creating functional lighting groups, the method comprising:
   responsive to commissioning commands sent over a wireless network, placing a plurality of wireless devices in a grouping mode, and directing the plurality of wireless devices to send messages over said wireless network indicating that they have been power cycled by a legacy line voltage switch; and receiving said messages within a gateway, and creating a functional lighting group comprising the plurality of wireless devices.

16. The method as recited in claim 15, wherein the plurality of wireless devices comprises wireless lighting fixtures, and wherein the wireless lighting fixtures are power cycled via activation of the legacy line voltage switch.

17. The method as recited in claim 16, wherein the wireless lighting fixtures comprise wireless fluorescent lights.

18. The method as recited in claim 16, wherein the wireless lighting fixtures comprise wireless light-emitting diode (LED) lights.

19. The method as recited in claim 16, wherein the plurality of wireless devices further comprises a wireless switch, and wherein, after formation of said functional lighting group, an operator toggles the wireless switch, and the gateway receives said messages and adds said wireless switch to said functional lighting group.

20. The method as recited in claim 19, further comprising:

via a wireless sensor, sending a commissioning message to the gateway when a corresponding commissioning mechanism is executed by an operator; and upon receipt of the commissioning message, adding the wireless sensor to the functional lighting group.

\* \* \* \* \*